United States Patent
Glover et al.

(10) Patent No.: US 10,331,680 B2
(45) Date of Patent: Jun. 25, 2019

(54) RANKING OF SEARCH RESULTS

(71) Applicant: Samsung Electronics Co., Ltd., Suwon-si, Gyeonggi-do (KR)

(72) Inventors: Eric Glover, Palo Alto, CA (US); Patrick La Victoire, Los Altos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 676 days.

(21) Appl. No.: 14/981,763

(22) Filed: Dec. 28, 2015

(65) Prior Publication Data

US 2017/0185599 A1 Jun. 29, 2017

(51) Int. Cl.
*G06F 16/2457* (2019.01)
*G06F 16/9535* (2019.01)
*G06F 16/9537* (2019.01)

(52) U.S. Cl.
CPC .... *G06F 16/24578* (2019.01); *G06F 16/9535* (2019.01); *G06F 16/9537* (2019.01)

(58) Field of Classification Search
CPC ........... G06F 17/3053; G06F 17/30867; G06F 17/3087; G06F 16/24578; G06F 16/9535; G06F 16/9537
See application file for complete search history.

(56) References Cited

U.S. PATENT DOCUMENTS

| | | | | |
|---|---|---|---|---|
| 2003/0037074 | A1* | 2/2003 | Dwork | G06F 17/30864 715/229 |
| 2009/0006360 | A1* | 1/2009 | Liao | G06F 17/30595 |
| 2009/0055523 | A1* | 2/2009 | Song | H04L 67/22 709/224 |
| 2009/0277322 | A1* | 11/2009 | Cai | G10H 1/0058 84/609 |
| 2009/0287668 | A1* | 11/2009 | Evans | G06F 17/3071 |
| 2010/0161596 | A1* | 6/2010 | Yan | G06F 17/30675 707/723 |
| 2013/0159298 | A1* | 6/2013 | Mason | G06F 17/30864 707/728 |

* cited by examiner

*Primary Examiner* — Kris E Mackes
*Assistant Examiner* — Lin Lin M Htay
(74) *Attorney, Agent, or Firm* — Jefferson IP Law, LLP

(57) ABSTRACT

Methods for ranking search results are disclosed. The methods include obtaining an unranked set of functionally similar search that all correspond to an action. The methods further include retrieving a ranking vector corresponding to the action. The ranking vector identifies a plurality of software applications that perform a function corresponding to the action and a ranking range for each of the plurality of software applications. The methods further include iteratively ranking the functionally similar search results of the unranked set to obtain a ranked set of functionally similar search results. The ranking is based on the retrieved ranking vector and a random number generator that generates random numbers between the minimum value and the maximum value of the ranking vector.

11 Claims, 7 Drawing Sheets

| Action: View Menu | |
|---|---|
| Restaurant Finder | 0≤x<50 |
| City Scapes | 50≤x<75 |
| Grubber Lang | 75≤x<95 |
| Review App | 95≤x≤100 |

FIG. 1B

| Unranked Search Results | Rel. Score |
|---|---|
| Grubberlang.co/... | .80 |
| Cityscapes.com/... | .82 |
| Restfinder.com/... | .79 |
| Reviewapp.com/... | .78 |
| Restfinder.com/... | .76 |

| Ranked Set Of Search Results – 1st | Rel. Score |
|---|---|
| Cityscapes.com/... | .827 |

| Ranked Set Of Search Results – 2nd | Rel. Score |
|---|---|
| Cityscapes.com/... | .82 |
| Restfinder.com/... | .79 |

FIG. 1F  
X = 88

| Ranked Set Of Search Results – 3rd | Rel. Score |
|---|---|
| Cityscapes.com/... | .827 |
| Restfinder.com/... | .79 |
| Grubberlang.co/... | .80 |

FIG. 1G  
X = 17

| Ranked Set Of Search Results – 4th | Rel. Score |
|---|---|
| Cityscapes.com/... | .827 |
| Restfinder.com/... | .79 |
| Grubberlang.co/... | .80 |
| Restfinder.com/... | .76 |

FIG. 1H  
X = 98

| Ranked Set Of Search Results – 6th | Rel. Score |
|---|---|
| Cityscapes.com/... | .827 |
| Restfinder.com/... | .79 |
| Grubberlang.co/... | .80 |
| Restfinder.com/... | .76 |
| Reviewapp.com/... | .78 |

RANKING OF SEARCH RESULTS

TECHNICAL FIELD

This disclosure relates to private ranking of search results, and in particular, ranking search results using ranking vectors.

BACKGROUND

Search systems can be utilized in many different fields. When search results are delivered, the search results are typically biased towards more popular applications. An application's popularity, however, does not necessarily mean that the application is better than other applications in the same field of endeavor. The bias toward more popular applications, a however, may keep users from discovering better applications via search results, as the more popular applications typically surface towards the top of the search result.

SUMMARY

According to some implementations of the present disclosure, a method for ranking search results at a search system is disclosed. The method includes receiving a search query to the remote device and identifying an unranked set of functionally similar search results based on the search query. The unranked set of functionally similar search results collectively link to states of two or more software applications. Each search result links to a specific state of a respective software application and the unranked set of functionally similar search results all correspond to an action. The method further includes retrieving a ranking vector corresponding to the action. The ranking vector identifies a plurality of software applications that perform a function corresponding to the action and a ranking range for each of the plurality of software applications. Each ranking range having a respective upper value and a respective lower value. The rankings ranges of the ranking vector do not overlap and collectively define a total range having a minimum value of the ranking vector and a maximum value of the ranking vector. The method further includes iteratively ranking the functionally similar search results of the unranked set to obtain a ranked set of functionally similar search results. The ranking is based on the retrieved ranking vector and a random number generator that generates random numbers between the minimum value and the maximum value of the ranking vector. The method also includes transmitting the ranked set of search results to the remote device.

According so some implementations of the present disclosure, a method for ranking search results at a user device is disclosed. The method includes transmitting a search query to a search system and receiving a set of unranked set of functionally similar search results based on the search query. The unranked set of functionally similar search results collectively link to states of two or more software applications. Each search result links to a specific state of a respective software application and the unranked set of functionally similar search results all correspond to an action. The method further includes retrieving a local ranking vector corresponding to the action. The local ranking vector identifies a plurality of software applications that perform a function corresponding to the action and a ranking range for each of the plurality of software applications. Each ranking range having a respective upper value and a respective lower value. The rankings ranges of the local ranking vector do not overlap and collectively define a total range having a minimum value of the ranking vector and a maximum value of the ranking vector. The method further includes iteratively ranking the functionally similar search results of the unranked set to obtain a ranked set of functionally similar search results. The ranking is based on the local ranking vector and a random number generator that generates random numbers between the minimum value and the maximum value of the local ranking vector. The method includes outputting the ranked set of functionally similar search results to a user interface of the user device.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1B is a schematic illustrating an example ranking vector.

FIG. 1C is a schematic illustrating an example of an unranked set of functionally similar search results.

FIGS. 1D-1H are schematics illustrating an example of ranking the functionally similar search results of FIG. 1C with the ranking vector of FIG. 1B.

FIG. 3 is a flow chart illustrating an example set of operations for a method for processing a search query.

Like reference symbols in the various drawings indicate like elements.

DETAILED DESCRIPTION

A search system that utilizes ranking vectors is described. A ranking vector is a data structure that is used to rank search results in a probabilistic manner. In some implementations, a ranking vector is a two dimensional data structure that lists applications and for each application includes a range defining an upper and lower limit. Ranking vectors can be global ranking vectors or local ranking vectors. Global ranking vectors pertain to data from multiple users. Local ranking vectors are ranking vectors that are specific to a user or user device that provided a search query. Local ranking vectors can be based on a default ranking vector (e.g., a global ranking vector) and then are maintained and updated at the user device based on the user's behavior. In some implementations, ranking vectors are action specific. In these implementations, the ranking vectors can be used to rank functionally similar search results. Functionally similar search results are search results that link to application states that perform similar functions (e.g., application states where users can view information about restaurants). Additionally, the ranking vectors may be location specific. In this way, the ranking of search results may be affected when the user travels to a new location.

In operation, the search system identifies a set of functionally similar search results in response to the search query received from a user device. The functionally similar search results all correspond to an action (e.g., "view restaurant info" or "make travel reservations"). In some implementations, the search system identifies a global ranking vector corresponding to the action. The search system can either rank the functionally similar search results using the global ranking vector or can transmit the global ranking vector to the user device with the unranked search results. In some implementations, the user device receives the search results and ranks the functionally search results using the local ranking vector. In some implementations, the user device may adjust the local ranking vector based on the global ranking vector received from the search system.

Figure 1A:
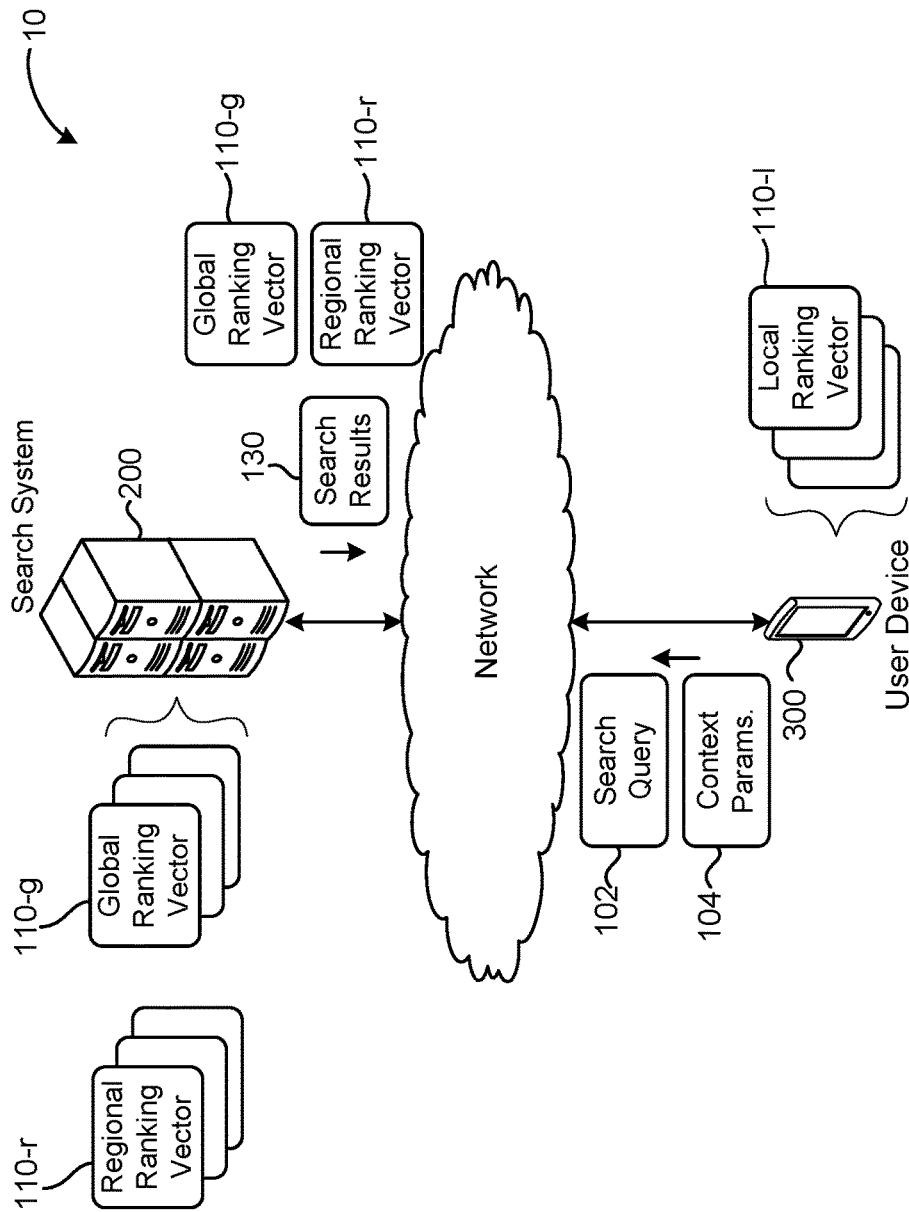
FIG. 1A is a schematic illustrating an example environment of a search system.

FIG. 1A illustrates an example environment 10 of a search system 200 that utilizes ranking vectors 110 to affect the rankings of search results 130. The ranking vectors 110 may be global ranking vectors 110-$g$ or local ranking vectors 110-$l$. In some implementations, each ranking vector 110 corresponds to a respective action. In these implementations, a ranking vector is used to rank functionally similar search results 130. Put another way, the ranking vector 110 is used to rank search results 130 that link to application states that perform functions classified under the same action. The search system 200 may collect engagement statistics relating to searches from user devices 300 (e.g., which search results 130 were selected and which search results 130 were passed over) to determine the global ranking vectors 110-$g$. In this way, the global ranking vector 110-$g$ is at least somewhat indicative of which application users generally prefer when searching for a particular action. The local ranking vectors 110-$l$ are specific to the user or the user device 300. Thus, the local ranking vector 110-$l$ indicates which application a user prefers when choosing an application to perform a particular action.

In operation, the search system 200 receives a search query 102 from the user device 300. The search system 200 may further receive one or more query parameters regarding the user device 300. The query parameters may include, but are not limited to, a location of the user device 300, a profile of the user of the user device 300, and/or a platform of the user device 300. In response to the search query 102, the search system 200 determines the search results 130. Each individual search result links to respective state of a software application. Thus, the search results 130 may link to a number of different software applications. The search system 200 can determine the search results 130 in any suitable manner. The search system 200 may perform record based searches, rules-based searches, entity searches, or the like. In identifying the search results 130, the search system 200 can identify one or more sets of search results 130 that are functionally similar. The functionally similar search results 130 may all link to application states that perform functions that are classified under a particular action. For example, the search query 102 may be "batman movie times." In response to the search query 102 and query parameters 104 (referred to as "context parameters" interchangeably throughout the disclosure) that indicate a location of the user device 300, the search system 200 may identify the search results 130 that include links to applications that provide show times for a Batman movie. Thus, the search results 130 include a set of search results that link to application states that perform functions corresponding to "show movie times."

A set of functionally similar search results 130 may be ranked using the ranking vector 110. In some implementations, the search system 200 may rank a set of functionally similar search results 130 using the global ranking vector 110-$g$. In these implementations, the search system 200 delivers ranked search results 140 to the user device. In other implementations, the user device 300 ranks a set of functionally similar search results 130 using the local ranking vector 110-$l$. In these implementations, the search system 200 delivers unranked search results 131 to the user device 300 and the user device 300 ranks the search results 130 based on a local ranking vector. In some of these implementations, the search system 200 may provide the global ranking vector 110-$g$ to the user device 300, which the user device 300 utilizes to modify the local ranking vector 110-$l$. Structurally, global ranking vectors 110-$g$ and local ranking vectors 110-$l$ may be the same. Thus, the term "ranking vector" 110 may refer to global ranking vectors 110-$g$ or local ranking vectors 110-$l$. Furthermore, "ranking vector" 110 may also refer to regional ranking vectors 110-$r$, discussed in greater detail below.

FIG. 1B illustrate an example of the ranking vector 110. In the example of FIG. 1B the ranking vector 110 pertains to the action "view restaurant menu." This action corresponds to states of applications that present menus from restaurants. In this example, the search system 200 has records pertaining to four applications that perform a function that can be classified under "view restaurant menu." These applications are "Restaurant Finder" 112-1, "City Scapes" 112-2, "Grubber Lang" 112-3, and "Review App" 112-4. Each application has a range 114 associated therewith. The range defines a lower end of the range and an upper end of the range of the application. Thus, in this example, Restaurant Finder has a range 114-1 from $0 \leq X < 50$, City Scapes has a range 114-2 from $50 \leq X < 75$; Grubber Lange has a range 114-3 from $75 \leq X < 95$; and Review App has a range 114-4 from $95 \leq X < 100$. In this example, the Restaurant Finder application 114-1 is the most popular application when users are viewing a menu, while Review App is the least popular application amongst users when viewing restaurant menus.

FIG. 1C-1G illustrate an example of a set of functionally similar search results 130 being ranked using the ranking vector 110 of FIG. 1B. The ranking of a search result can refer to the order in which search results 130 are displayed in a search engine results page (SERP). Assuming the ranking vector 110 is the global ranking vector 110-$g$ and the search system 200 is ranking the search results 130, the search system 200 may rank the search results 130 by generating a random number that is greater than 0 and less than or equal to the upper limit of the ranking vector 110 (in this example 100). Depending on which range the random number falls into, the search system 200 picks the most relevant search result linking to the application whose range the random number fell within.

In the example of FIGS. 1C-1F, the search system 200 has identified five individual search results 134 directed to the "view restaurant menu" action and respectively linking to the four applications indicated in the ranking vector. FIG. 1C, illustrates the unranked search results 131. FIG. 1D illustrates the first pass of an example ranking process. Prior to the example of FIG. 1D, the search system 300 has generated an empty ranked set 140 of functionally similar search results 130. In FIG. 1D, the search system 200 generates the random value (x=60). In response to generating the random value (60), the search system 200 determines that the random value 60 falls in the range of the City Scapes application 130-2. Thus, the search system 200 selects the search result 134-2 corresponding to City Scapes 130-2 and adds the City Scapes search result 130 as the first search result 134-2 in the ranked set 140 of functionally similar search results 130.

FIG. 1E illustrates the second pass of the example ranking process. In FIG. 1E, the search system 20 generates the random value (32), which the search system 200 determines belongs in the range 114-1 associated with the Restaurant Finder application 112-1. Thus, the search system 200 includes the highest scoring search result 134-3 corresponding to the Restaurant Finder application in the ranked set of functionally similar search results 130.

FIG. 1F illustrates the third pass of the example ranking process. In the example of FIG. 1F, the search system 200 generates the random value (88), which falls in the range 114-3 of the Grubber Lang application 112-3. Thus, the search system 200 includes the search result 134-1 corresponding to the Grubber Lange application 112-3 in the third position of the ranked search results 140.

FIG. 1G illustrates the fourth pass of the example ranking process. In the example of FIG. 1G, the search system 200 generates the random value (17), which falls in the range of the Restaurant Finder application. In this example, the search system 200 includes the second highest scoring search result 134-5 corresponding to the Restaurant Finder application in the fourth position of the ranked set 140 of functionally similar search results 130.

Prior to the example of FIG. 1H, the search system 200 has generated the random values (52), (82), and (98) on the fifth and sixth passes respectively (not shown). On the fifth and sixth pass, the random values fell into ranges of the City Scapes application 112-2 and the Grubber Lang application 112-3, both of which have no search results remaining in the unranked search results 131. In the example of FIG. 1H, the search system 200 generates the random value (98), which falls in the range 114-4 of the Review App application 112-4. Thus, the search system 200 includes the Review App search result 134-4 in the fifth position of the ranked set 140 of functionally similar search results 130. At this juncture, all the search results 134 have been removed from the unranked search results 131 to the ranked set 140 of functionally similar search results 130. Thus, the search system 300 may stop ranking the search results.

In the example of FIGS. 1C-1H, the search system 200 does not modify the ranges of the ranking vector 110 while ranking the functionally similar search results 130. In other implementations, however, the search system 200 may be configured to modify the ranges in the ranking vector to avoid a halting problem (e.g., where the random numbers could be generated that do not correspond to an application having search results in the unranked set of functionally similar search results 130). In these implementations, the search system 200 may remove a range of an application from the ranking vector 110 when the search results 130 linking to the application have all been removed from the unranked search results 131. Upon removing a range from the ranking vector 110, the search system 200 may compress the ranges of the remaining applications in the ranking vector 110. For example, after the iteration of FIG. 1D, there are no more search results corresponding to the City Scapes application. Thus, the search system 200 may remove the range corresponding to City Scapes (e.g., $50 \leq x < 75$) from the ranking vector 110 and may compress the remaining ranges. Thus, after removal and compression the range of Restaurant Finder may remain as $0 \leq x < 50$, the range of Grubber Lange may be shifted to $50 \leq 60$, and the range of Review App may be shifted to $60 \leq x < 65$. The search system 200 may also adjust the minimum and/or maximum values of the random number. In this example, after compression the maximum value of the random number is 65.

The example of FIGS. 1C-1H, the search system 200 determines the ranked set 140 of search results 130. In some implementations, the search system 200 may provide the unranked search results 131 to the user device 300. In those implementations, the search system 200 may use the local ranking vector 110-$l$ to rank the search results 130 in the manner described above.

Figure 2:
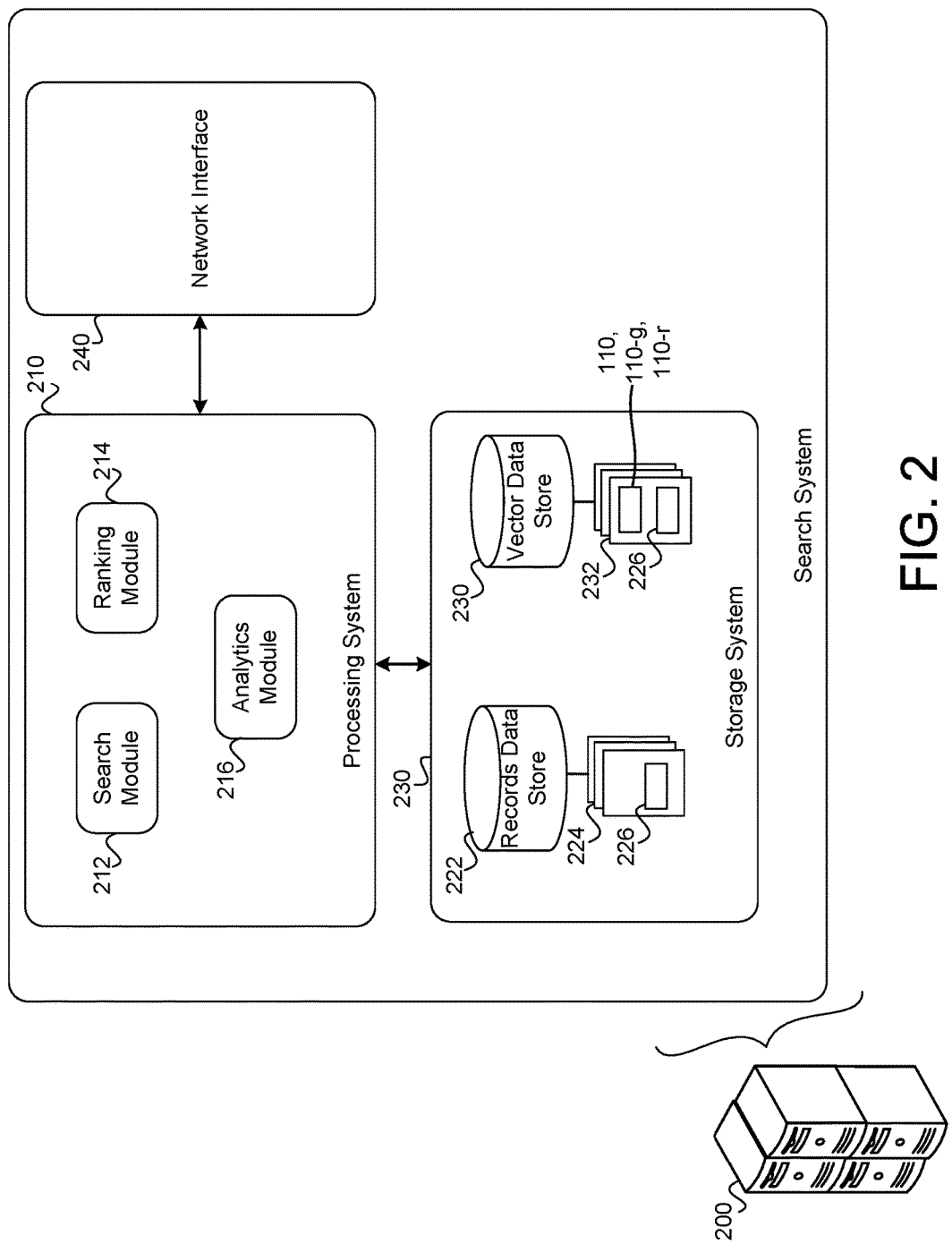
FIG. 2 is a schematic illustrating example components of a search system.

FIG. 2 illustrates an example set of components of the search system 200. In the illustrated example, the search system 200 includes a processing system 210, a storage system 220, and a network interface 240. The components depicted in FIG. 2 are provided for example, and the search system 200 may include any other suitable components. The components may be interconnected, for example, by a bus and/or any other form or medium of digital data communication, e.g., a communication network 150.

The processing system 210 is a collection of one or more processors that execute computer readable instructions. In implementations having two or more processors, the two or more processors can operate in an individual or distributed manner. In these implementations, the processors may be connected via a bus and/or a network. The processors may be located in the same physical device or may be located in different physical devices. The processing system executes a search module 212, a ranking module 214, and an analytics module 216. The processing system executes other modules not explicitly shown.

The network interface device 240 includes one or more devices that perform wired or wireless (e.g., Wi-Fi or cellular) communication. Examples of the network interface devices include, but are not limited to, a transceiver configured to perform communications using the IEEE 802.11 wireless standard, an Ethernet port, a wireless transmitter, and a universal serial bus (USB) port.

The storage system 220 includes one or more storage devices. The storage devices may be any suitable type of computer readable mediums, including but not limited to read-only memory, solid state memory devices, hard disk memory devices, and optical disk drives. The storage devices may be connected via a bus and/or a network. Storage devices may be located at the same physical location (e.g., in the same device and/or the same data center) or may be distributed across multiple physical locations (e.g., across multiple data centers). The storage system 220 stores a search record data store 222 and a ranking vector data store 230.

The search record data store 222 stores search records 224 that the search module 212 utilizes to execute searches and output search results 130. Depending on the type of search or searches that is or are performed by the search module 212 the contents of the search records 224 may vary. In some implementations, the search records 224 may be application state records. In these implementations, the application state records 222 store data related to crawled and indexed states of software applications. These application states are generally static states. In these implementations, the application state records can include a state identifier that uniquely identifies the state of the software application to which the search record 224 corresponds, one or more access mechanisms (e.g., URLS, application resource identifiers) to access the state, state information data (e.g., the text that is presented at the state), and link data (e.g., data that is displayed in a search result, such as a logo of the application).

The application state records also include an action identifier 226 (action ID). The action identifier indicates the action performed at the state. As previously discussed, an action may correspond to one or more functions performed by one or more software applications. For example, an action may be "make travel reservations." Classified under this action may include the functions "make flight reservation," "purchase plane tickets," "make hotel reservation," "make car rental reservation," and the like. Each known action may be identified in an action ontology. The action ontology may define the set of known actions that are performed by software applications (e.g., a domain of actions) and for each action, the set of known functions that are classified under the action. Each action may be assigned a corresponding action ID. The action ontology may be hand curated.

In addition to or in lieu of application state records, the search records 224 may include app-specific rules. App-specific rules store data relating to the generation of state identifiers and/or access mechanisms. An app-specific rule may include one or more templates that are used to generate state identifiers and/or access mechanisms. In one example, a template corresponding to a flight miles calculator may receive three parameters: a first airport code, a second airport code, and a round-trip flag that indicates whether the flight is a round trip. The template can define the manner by which those parameters are indicated in an access mechanism (e.g., a URL or application access mechanism). In this example, a template to generate a URL may be: "www.milescalculator.com/[airport1]&[airport2]&[roundtripflag]".

The template receives the parameter values and outputs an access mechanism based on the received parameter values. Each template corresponds to a particular function of a software application. In the example of the flight miles calculator, the function is calculating flight miles. Other examples of functions include, but are not limited to, "make flight reservation," "purchase tickets," and "send message." A template may be parameterized with terms contained in the search query 102 and/or received as context parameters 104. Additionally the templates may be parameterized using data inferred from the search query 102 and/or context parameters 104. In this way, the search results 130 may output access mechanisms that link to relatively dynamic states of software applications. The app-specific rules may further include triggering data, such as keywords and/or entity types that cause the search module 212 to identify the app-specific rules that are relevant to the search query 102. An app-specific rule also includes the action ID 226, as was described above. In these implementations, the action ID 226 corresponds to the function that is performed by application states that are linked to by the access mechanisms generated by the template defined in the app-specific rule.

Application state records and app-specific rules are examples of the search records 224. U.S. patent application Ser. No. 14/566,283, filed on Dec. 10, 2014, describes application state records and app-specific rules in greater detail, the contents of which are hereby incorporated by reference. The search records may include additional or alternative types of search records as well.

The storage system 220 further stores the vector data store 230. The vector data store 230 stores ranking vector data records 232. Each vector data record 232 includes the global ranking vector 110-$g$ and the action ID 226. The action ID 226 defines the action to which the global ranking vector 110-$g$ corresponds. As previously discussed, each global ranking vector 110-$g$ may correspond to an action. The global ranking vector 110-$g$ may indicate a list of applications 112 (e.g., FIG. 1B) that perform a function corresponding to the action. Each application 112 in the list of applications may include a range 114 (e.g., FIG. 1B). As was discussed, the range is used when ranking a set of search results 130 that are functionally similar. In some implementations, the ranking vector data records 232 are indexed by the action IDs 226.

In some implementations, the vector data record 232 also stores regional ranking vectors 110-$r$ corresponding to an action. Regional global ranking vector 110-$r$ are global ranking vectors 110-$g$ that are specific to an action and a region. Thus the regional ranking vector 110-$r$ is indicative of users' collective preferences of application when performing a function corresponding to an action in a particular region. The structure of the regional ranking vector 110-$r$ is substantially the same structure of the global ranking vector 110-$g$, but also defines a geographical region (e.g., a geofence, a state, a city, a country, a country, or a continent). Thus, if there are regional applications that users prefer, a new user to that region may be presented with search results 130 linking to the regional applications. For example, if a user is searching for a restaurant while visiting San Francisco and there is a San Francisco based restaurant application that the majority of users in the region use when searching for restaurant info, the regional ranking vector 110-$r$ corresponding to the "restaurant info" action and the region including San Francisco may have a very large range for the San Francisco based application. In the global ranking vector 110-$g$ corresponding to the "restaurant info" action and in other regional ranking vectors 110-$r$, the range of the San Francisco may be very small (e.g., a range spanning one unit). Regional ranking vectors 110-$r$ may be indexed by region (e.g., by geolocation or a region ID) and action ID, whereby the index may return the regional ranking vector 110-$r$ only if queried with both the region (e.g., a geolocation or region ID) and action ID.

It is noted that in implementations that support regional ranking vectors 110-$r$, the global ranking vectors 110-$g$ and various regional ranking vectors 110-$r$ corresponding to the same action should have the same list of applications. For example, the San Francisco based restaurant application should appear in the global ranking vector 110-$g$ corresponding to the "restaurant info" action and the regional ranking vectors 110-$r$ corresponding to the "restaurant info" action. Furthermore, there need not be regional ranking vectors 110-$r$ for all known regions. In the event a region does not have the regional ranking vector 110-$r$ corresponding to a particular action, the global ranking vector 110-$r$ corresponding to the particular action can be used as the ranking vector 110.

The search module 212 receives the search query 102 and, in some implementations, context parameters 104. The search module 212 outputs search results 130 responsive to the search query 102. Each individual search result may include one or more access mechanisms that link to a state of a software application, a relevance score of the search result, display data, and an action identifier. The relevance score indicates a relative degree of relevance of the search result given the search query 102 and/or context parameters 104. The display data may include any information that is presented in the displayed search result. For example, the display data may include a text snippet relating to the search result, an icon of an application that is linked to, an image associated with the state of the application that is linked to, or any other suitable data.

As previously indicated, the search module 212 can identify the search results 130 in a variety of manners. In some implementations, the search module 212 performs an index-based search. In these implementations, the search module 212 queries one or more search indexes that index application state records. The search module 212 queries the search indexes with one or more of the terms of the search query 102 and/or the query parameters 104. The search index outputs state identifiers of application state records or the actual application state records that include any of the terms and/or query parameters. The search module 212 can score each record based on a number of features. In some implementations, the search module 212 utilizes a machine-learned scoring model to score the output records. In other implementations, the search module 212 utilizes scoring functions to score the records.

In some implementations, the search module 212 performs a rules-based search. In these implementations, the search module 212 identifies app-specific rules based on the search query and/or the query parameters. The search module 212 then generates state identifiers and/or access mechanisms based on the app-specific rules, the search query, and/or the context parameters. The search module 212 can score each of the generated state identifiers and/or access mechanisms based on a number of features. In some implementations, the search module 212 utilizes a machine-learned scoring model to score the generated state identifiers and/or access mechanisms. In other implementations, the search module 212 utilizes scoring functions to score the records.

An example implementation of a search module that performs index-based search and/or rules based search is presented in U.S. patent application Ser. No. 14/566,283, filed on Dec. 10, 2014, the contents of which are incorporated by reference.

In some implementations, the ranking module 214 ranks sets of functionally similar search results 130 using a global-ranking vector 110-g corresponding to the action of the functionally similar search results 130. In other implementations, the ranking module 214 may retrieve global-ranking vectors 110-g corresponding to the actions of one or more sets of functionally similar search results 130 for transmission to the user device 300. In these implementations, the ranking module 214 receives the search results 130 from the search module 212. The search results may include one or more sets of functionally similar search results 130, whereby each set of functionally similar search results 130 corresponds to a different action. As discussed, the search module 212 outputs the unranked search results 131, whereby each individual result includes an action ID corresponding to the search result. Thus, the ranking module 214 can group functionally similar search results 130 based on the action ID thereof. In this way, the ranking module 214 identifies the one or more sets of functionally similar search results 130. The ranking module 214 can then retrieve the global ranking vector 110-g for each set of functionally similar search results 130 using the action ID 226 of the functionally similar search results 130. For example, the ranking module 214 can query the ranking vector data store 230 using an action ID corresponding to a set of functionally similar search results 130. The ranking vector data store 230 returns the ranking vector data record 232 associated with each action ID 226. The ranking module 214 can identify the global ranking vector 110-g for each identified set of functionally similar search results 130. The ranking module 214 can include the global ranking vectors 110-g in the returned ranking vector data record 232 in the container containing the search results 130. For example the ranking module 214 can encode the unranked search results 131 and the respective global ranking vectors 110-g in a container, such as a JSON document. The ranking module 214 can then transmit the container to the user device 300. It is noted that in some implementations, the ranking module 214 outputs the global ranking vectors 110-g to a downstream component, which generates the container and/or transmits the container to the user device 300.

In some implementations, the ranking module 214 may be configured to include the regional ranking vector 110-r in lieu of the global ranking vector 110-g with the unranked search results 131. In these implementations, the ranking module 214 may query the vector data store 230 with a region (e.g., geolocation or region ID) and an action ID. If the vector data store 230 outputs the regional ranking vector 110-r corresponding to the region and action ID, the ranking module 214 includes the regional ranking vector 110-r with the unranked search results 131. Otherwise, the ranking module 214 includes the global ranking vector 110-g corresponding to the action ID with the unranked search results 131.

In implementations where the ranking module 214 ranks sets of functionally similar search results 130, the ranking module 214 groups the functionally similar search results 130 based on their respective action IDs. For each set of functionally similar search results 130, the ranking module 214 obtains the ranking vector 110 corresponding to the action ID 226 of the functionally similar search results 130 from the ranking vector data store 230 using the action ID 226. In some implementations, the ranking module 214 ranks each set of functionally similar search results 130 214 using the global ranking vector 110-g corresponding thereto. As previously discussed, the ranking vector 110 has an overall range from a lower value to an upper value, whereby the range associated with each application listed in the ranking vector 110 falls between the lower and upper value. The ranking module 214 implements a random number generator that generates a random number between the lower value of the ranking vector 110 and the upper value of the ranking vector 110. The random number generator may be constrained with the lower value (i.e., the minimum value of the lowest range) and upper value (i.e., the maximum value of the highest range) of the ranking vector 110. In implementations where the ranges may change during the ranking, the constraints of the random number generator may be updated when the ranges in the ranking vector are updated.

The ranking module 214 can rank a set of functionally similar search results 130 using the random number generator and the global ranking vector 110-g corresponding to the functionally similar search results 130. In some implementations, the ranking module 214 maintains the ranked set 140 of functionally similar search results 130. Initially, the ranked set 140 is empty. The ranking module 214 iteratively appends individual search results 134 to the ranked set 140 of search results 130. In doing so, the ranking module 214 iteratively generates a random number between the lower limit and upper limit of the global ranking vector 110-g. At each pass, the ranking module 214 determines the range in the global ranking vector 110-g that the random number fall into. In other words, the ranking module 214 determines to which application in the global ranking vector 110-g does the random number correspond. The ranking module 214 then determines if the set of functionally similar search results 130 includes any search results corresponding to the identified application. If so, the ranking module 214 removes the search result having the highest relevance score that links to the identified application from the (unranked) set 131 of functionally similar search results 130 and appends the removed search result to the ranked set 140 of functionally similar search results 130. If there are no search results 130 that correspond to the identified application, the ranking module 214 generates a new random number. Each time the ranking module 214 adds a new search result to the ranked set 140 of functionally similar search results 130, the ranking module 214 can generate a new random number until the (unranked) set 131 of functionally similar search results 130 is exhausted. Furthermore, in some implementations the ranking module 214 may remove the range corresponding to the identified application from the ranking vector when there are no more search results 130 linking to the identified application remaining in the (unranked) set 131 of functionally similar search results 130. In these implementations, the ranking module 214 compresses the other ranges of the other applications in the ranking vector, such that the remaining ranges are contiguous. In compressing the ranges in the ranking vector, the minimum value and/or the maximum value of the ranking vector are updated. Thus, the minimum and maximum constraints on the random number generator are updated in accordance with the minimum and maximum value of the ranking vector after compression of the ranges. In these implementations, the efficiency of the ranking module 214 may be improved as the number of iterations performed by the ranking module 214 when ranking a set of functionally similar search results 130 may be reduced. As used herein, the term "append" or "appending" may refer to the operation of adding an item to the end of a list. For example, if a first set includes the items X followed by Y, appending the item Z to the list would result in X, followed by Y, followed by Z. An example pseudo code algorithm that may be executed by the ranking module 214 is provided in Appendix A.

In some implementations, the ranking module 214 is configured to rank sets of functionally similar search results 130 using regional ranking vectors 110-$r$. In these implementations, the ranking module 214 can query the ranking vector data store 230 with the action ID of each set of functionally similar search results 130 and the location received in the query parameters 104 (e.g., geographical coordinates) or a region ID corresponding to the location received in the query parameters 104. In the event the regional ranking vector 110-$r$ corresponding to the action and region exists, the ranking module 214 can utilize the regional ranking vector 110-$r$ to rank a set of functionally similar search results 130. Otherwise, the ranking module 214 may utilize the global ranking vector 110-$g$ corresponding to the action. The ranking module 214 may rank a set of functionally similar search results 130 using the regional ranking vector 110-$r$ or may transmit the regional ranking vector 110-$r$ with the set of functionally similar search results 130, to the extent that the ranking module 214 is not configured to rank search results 130 but only to identify the ranking vectors 110 to transit to the user device 300.

The ranking module 214 can transmit the ranked search results to the user device 300. In some implementations, the ranking module 214 may interleave the ranked sets 140 of functionally similar search results 130. In other implementations, the ranking module 214 can keep the ranked sets 140 of functionally similar search results 130 in separate ranked sets 140. The ranking module 214 can encode the ranked search results 140 (interleaved or otherwise) in a container, such as a Java script object notation (JSON) document. The ranking vector 214 can then transmit the container to the user device 300. It is noted that in some implementations, the ranking module 214 outputs the ranked search results 140 to a downstream component, which generates the container and/or transmits the container to the user device 300.

The analytics module 216 can monitor user engagement with displayed search results 130 and may update the global ranking vectors 110-$g$ (or regional ranking vectors 110-$r$) accordingly. Each time the search system transmits the search results to the user device 300, the user device 300 may report the user's engagement with the search results 130. Engagement with search results 130 includes a user selecting a particular search result 130. Engagement with the search results 130 may also include a user passing over a higher ranked search result. For instance, if a user is shown three search results 130 and the user passes over the first two search results 130, the analytics module 216 can negatively score the applications corresponding to the passed over search results and can positively score the application corresponding to the selected search result. In some implementations, the analytics module 216 can track statistics of application/action combinations. For example, for each particular action, the analytics module 216 can maintain a list of applications that perform the action and a score for each application. The score of an application may be indicative of user engagement with search results 130 linking to a state of the application that corresponds to the action. For example, each time a user selects a search result linking to a state of the application that corresponds to the action the analytics module 216 can increment the score of the application by a predetermined amount (e.g., five points). Similarly, each time the user selects a search result that links to a state of another application that corresponds to the action and passes over a search result that links to a state of the application that corresponds to the action, the analytics module 216 may decrement the score (e.g., negative two points). The analytics module 216 may calculate the scores of action-application combinations in other manners as well.

For each action, the analytics module 216 can update the global ranking vector 110-$g$ of the action (or regional ranking vector 110-$r$). The analytics module 216 can update the range for each global ranking vector 110-$g$ of an action based on the engagement statistics collected by the analytics module 216. For example, the analytics module 216 may normalize the scores corresponding to a particular action such that the sum of the normalized scores are equal to an upper value. For example, if the scores of three applications are 10000, 3700, and 1300, and the upper value is 100, the scores may be normalized to 67, 25, and 8, assuming the analytics module 216 rounds to an integer value. Thus, the ranges may be $0 \leq x < 67$, $67 \leq x < 92$, and $92 \leq x < 100$. The analytics module 216 can update the global ranking vector 110-$g$ for each action in this manner. The analytics module 216 may update the global ranking vectors 110-$g$ at predetermined times, e.g., hourly, daily, weekly, or monthly. It is noted that the analytics module 216 can further manipulate the ranking vectors 110. For example, the analytics module 216 can raise the ranges by an exponent (e.g., squaring or cubing the ranges) to bias rankings towards more popular applications.

Figure 3:
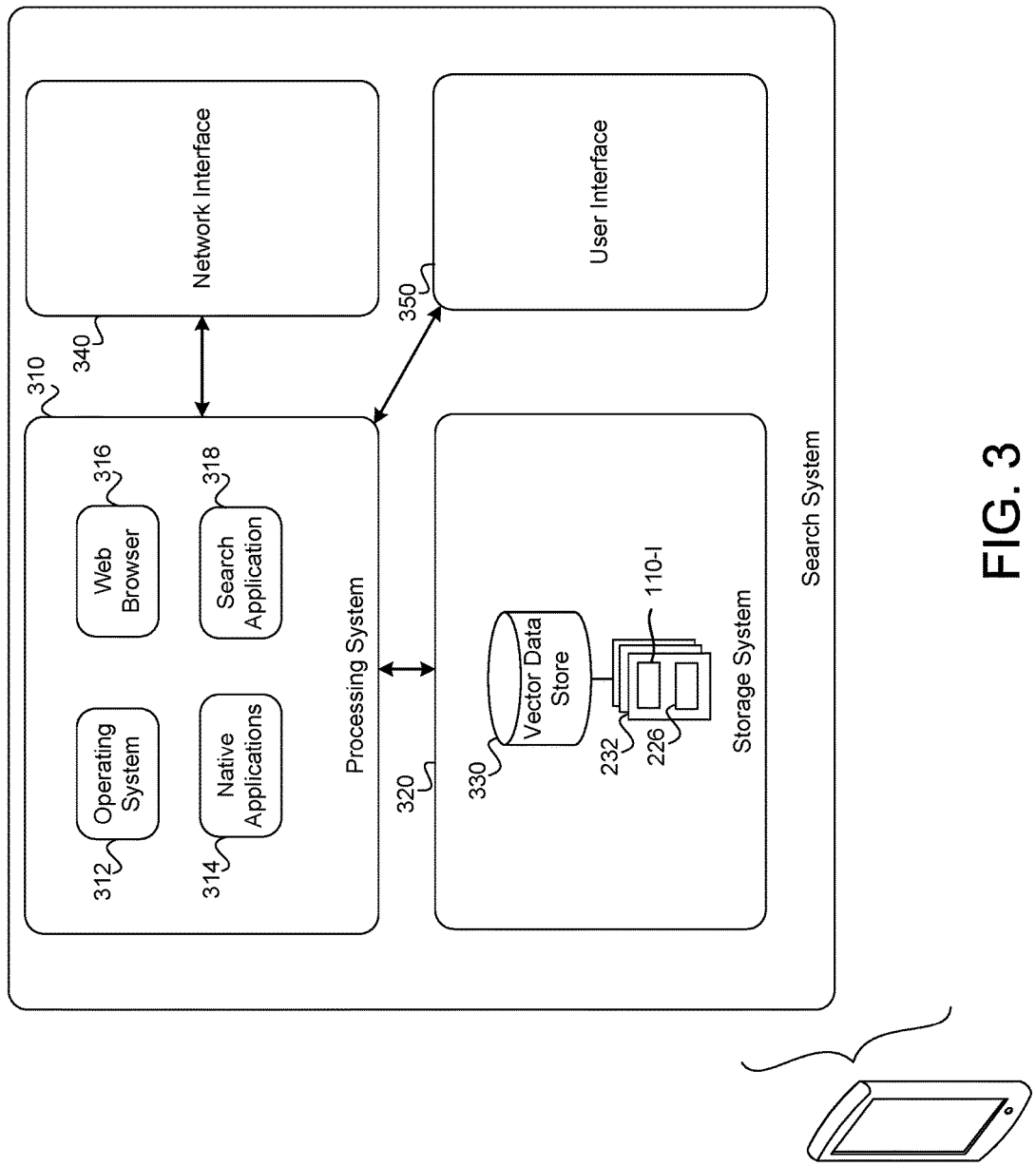
FIG. 3 is a schematic illustrating example components of a user device.

FIG. 3 illustrates the user device 300 configured to perform searches. In particular, the user device 300 is configured to provide search queries 102 to the search system (or search engine) 200 and to render search results 130 received from the search engine 200. In the illustrated example, the user device 300 includes a processing device 310, a storage device 320, a network interface 340, and a user interface 350.

The processing device 310 includes memory (e.g., RAM and/or ROM) that stores computer-readable instructions and one or more processors that execute the computer-readable instructions. In implementations where the processing device 310 includes two or more processors, the processors can execute in a distributed or individual manner. The processing device 310 may execute an operating system 312, one or more native applications 314, a web browser 316, and a search application 318, all of which may be embodied as computer-readable instructions.

The storage device 320 includes one or more computer-readable mediums (e.g., hard disk drive and/or flash memory). The storage device 320 can store the computer-readable instructions that make up the search application 318, the web browser 316, the operating system 312, and the one or more native applications 314. The storage device may also store the ranking vector data store 230 that stores ranking vector data records 232. A ranking vector record 332 stores the local ranking vector 110-$l$ and the action ID 226 corresponding to the local ranking vector 110-$l$. As previously discussed the local ranking vector 110-$l$ is the ranking vector 110 that is based on the user's preferences of applications when leveraging an action. Initially the local ranking vector 110-$l$ may have default values defined in the global ranking vector 110-$g$. The search application can update the ranges in the local ranking vectors 110-$l$ as the user continues to engage with search results 130 corresponding to the action of the local ranking vector 110-$l$.

The network interface 340 includes one or more devices that are configured to communicate with the network. The network interface 340 can include one or more transceivers for performing wired or wireless communication. Examples of the network interface 340 can include, but are not limited to, a transceiver configured to perform communications using the IEEE 802.11 wireless standard, an Ethernet port, a wireless transmitter, and a universal serial bus (USB) port. The user interface 350 includes one or more devices that receive input from and/or provide output to a user. The user interface 350 can include, but is not limited to, a touchscreen, a display, a QWERTY keyboard, a numeric keypad, a touchpad, a microphone, and/or speakers The search application 318 displays a search bar and receives search queries 102 via the search bar. In particular, a user can enter one or more query terms into the search bar. In some implementations, the search application 318 waits until the user executes the search (e.g., presses upon a "search" button displayed in relation to the search bar) to transmit the search query 102 to the search engine 200. In response to the search query 102, the search engine 200 responds with search results 130. The search application renders and displays the search results 130 in the SERP.

In the illustrated example, the search application 318 is the native application 314 comprising computer-readable instructions that are executed by the processing device 310. In some implementations, the search application 318 may be integrated in the operating system 312 or may be a web application accessed via the web browser 316.

The search application 318 receives search queries 102 from a user. For example, in some implementations, the search application 318 presents a graphical user interface that includes a search bar. In other implementations, the search application 318 receives search queries via the web browser 316. In some implementations, the search application 318 determines one or more context parameters 104.

For example, the search application 318 may determine a location of the user device 300 and a time of day. The search application 318 transmits the search query 102 and the query parameters 104 to the search engine 200. In some implementations, the search engine 200 returns unranked search results 131 in response to the search query 102. In other implementations, the search engine 200 returns ranked search results 140. In these implementations, the search application 318 displays the ranked search results 140 via the graphical user interface. The search application 318 may interleave the ranked sets 140 of functionally similar search results 130 and may output the interleaved search results 130 to a search engine results page (SERP). Alternatively, the search application 318 may display the ranked sets 140 of functionally similar search results 130 in different columns or at different screens of the SERP.

In some implementations, the search results 130 are not ranked. In these implementations, the search application 318 ranks the one or more sets of functionally similar search results 130 using one or more respective local ranking vectors 110-$l$. As previously indicated, the local ranking vectors 110-$l$ may be action specific. Each local ranking vector 110-$l$ can indicate one or more applications that correspond to the action and, for each application, a range corresponding to the application. The range of an application indicates a user's relative preference of using the application to perform a function corresponding to the action. As a user increasingly uses (e.g., selects search results) a certain application for performance of a particular function, the search application 318 may update the range of the application in the local ranking vector 110-$l$ of the action corresponding to the function in relation to the ranges of the other applications that perform functions corresponding to the action. Furthermore, as the user increasingly passes over search results 130 that link to states of applications that perform functions corresponding to the action, the search application 318 decreases the ranges of the applications in the local ranking vector 110-$l$.

Upon receiving unranked search results 131, the search application 318 can retrieve local ranking vectors 110-$l$ with which to rank the (unranked) sets 131 of functionally similar search results 130. For each set of functionally similar search results 130, the search application 318 can retrieve the local ranking vector 110-$l$ corresponding to the action defined in the set of functionally similar search results 130. The search application 318 then ranks the set of functionally similar search results 130 based on the local ranking vector 110-$l$. The search results 130 may or may not be received with one or more global ranking vectors 110-$g$ (or regional ranking vectors 110-$r$). In implementations where the search results 130 are received with one or more global ranking vectors 110-$g$, the search application 318 utilizes the global ranking vectors 110-$g$ to adjust the retrieved local ranking vectors 110-$l$. For example, for each application listed in the global ranking vector 110-$g$ and the corresponding local ranking vector 110-$l$, the search application 318 can multiply the range of the application in the global ranking vector 110-$g$ with the range of the application in the local ranking vector 110-$l$. The resultant product is used as the range in the local ranking vector 110-$l$. In this way, the range in the local ranking vector 110-$l$ takes into account the user's preferences while taking into account trends of other users.

For each set of functionally similar search results 130, the search application 318 ranks the functionally similar search results 130 based on the ranking vector. As previously discussed, each search result may include a relevance score associated therewith. Furthermore, the search application 318 may implement a random number generator, as was described above. The search application 318 can rank a set of functionally similar search results 130 using the random number generator and the local ranking vector 110-*l* corresponding to the functionally similar search results 130. In some implementations, the search application 318 maintains the ranked set 140 of functionally similar search results 130. Initially, the ranked set 140 is empty. The search application 318 iteratively appends individual search results 130 to the ranked set 140 of search results. In doing so, the search application 318 iteratively generates a random number greater than or equal to the lower limit and less than the upper limit of the local ranking vector 110-*l*. At each pass, the search application 318 determines the range in the local ranking vector 110-*l* that the random number fall into. In other words, the search application 318 determines to which application in the local ranking vector 110-*l* does the random number correspond. The search application 318 then determines if the (unranked) set 131 of functionally similar search results 130 includes any search results corresponding to the identified application. If so, the search application 318 removes the search result linking to the identified application with the highest relevance score from the (unranked) set 131 of functionally similar search results 130 and appends the removed search result to the ranked set 140 of functionally similar search results 130. If there are no search results 130 that correspond to the identified application, the search application 318 generates a new random number. Each time the search application 318 adds a new search result to the ranked set 140 of functionally similar search results 130, the search application 318 can generate a new random number until the (unranked) set 131 of functionally similar search results 130 is exhausted. Furthermore, in some implementations the search application 318 may also remove the range corresponding to the identified application from the local ranking vector 110-*l* when there are no more search results 130 linking to the identified application remaining in the (unranked) set 131 of functionally similar search results 130. In these implementations, the search application 318 compresses the other ranges of the other applications in the local ranking vector, such that the remaining ranges are contiguous. In compressing the ranges in the ranking vector, the minimum value and/or the maximum value of the ranking vector are updated. Thus, the minimum and maximum constraints on the random number generator are updated in accordance with the minimum and maximum value of the ranking vector after compression of the ranges. In these implementations, the efficiency of the search application 318 may be improved as the number of iterations of the search application 318 performs while ranking a set of functionally similar search results 130 may be reduced. An example pseudo code algorithm that may be executed by the search application 318 is provided in Appendix B.

The search application 318 can rank each set of functionally similar search results 130 in the manner described above. Upon ranking each set of functionally similar search results 130, the search application 318 can output the ranked search results 130 to the SERP. As previously indicated, the search application 318 can interleave the different ranked sets 140 of search results and output the interleaved search results 130 to the SERP. Alternatively, the search application 318 can output the ranked sets 140 of functionally similar search results 130 separate and apart. For example, the search application 318 can output different ranked sets in different columns or in different pages of the SERP. In the latter scenario, a user may click on a tab or swipe left or right to see a different set of functionally similar search results 130. In this configuration, the user can view search results 130 corresponding to different actions by clicking on a tab and/or swiping left or right.

The search application 318 can be further configured to maintain and report engagement statistics. Each time a user performs a search, the search application 318 can report the search result ultimately selected by the user as well as other search results 130 that were passed over. In this way, an application linked to by a search result 130 is penalized if the search result was not selected and passed over. Put another way, an application is not penalized if the search result was not selected but not passed over by the user. The search application 318 can update the local ranking vector 110-*l* corresponding to a selected search result. The search application 318 may also report the engagement statistics to the search engine 200. Reporting the engagement statistics may include reporting the selected search result. Additionally, the search application 318 may report the passed over search results 130, provided the search application 318 ranked the search results 130.

In some variations of the present disclosure, the search application 318 may be configured to utilize regional ranking vectors 110-*r*. In these implementations, the search application 318 may receive the regional ranking vector 110-*r* from the search system 200. In some implementations, the search application 318 may utilize the regional ranking vector 110-*r* in lieu of the local ranking vector 110-*l*, when the user device 300 is outside the typical region of the user (e.g., the user is traveling). In other implementations, the search application 318 can modify the local ranking vector 110-*l* using the received regional ranking vector 110-*r* in the manner described above with respect to the global ranking vectors 110-*g*.

Figure 4:
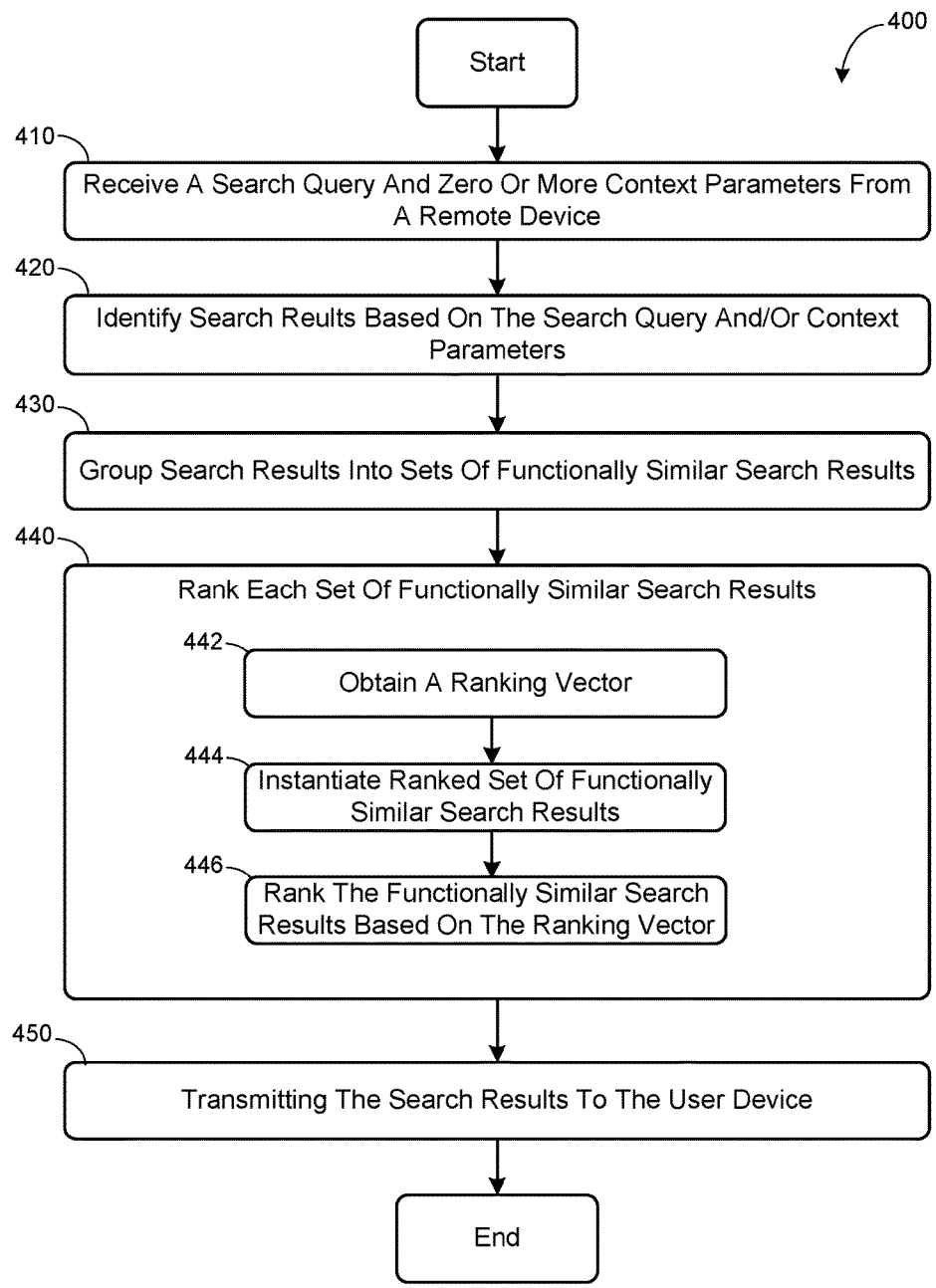
FIG. 4 is a flow chart illustrating an example set of operations of a method for ranking search results at a search system.

FIG. 4 illustrates an example an example set of operations of a method 400 for ranking search results 130. The method 400 is described with respect to the components executed by the processing system 210 of the search system 200.

At operation 410, the search module 212 receives the search query 102 from the user device 300. In some implementations, the search module 212 further receives one or more context parameters 104, including a location of the user device 300.

At operation 420, the search module 212 identifies search results 130 based on the search query and/or the context parameters 104. As previously discussed, the search module 212 can generate the search results 130 in any suitable manner. The search module 212 may perform index-based record searches and/or rules-based searches to identify the search results 130. In the former scenario, the search module 212 searches an indexed set of application state records based on the search query and/or context parameters to identify the search results 130. In the latter scenario, the search module 212 generates state identifiers and/or access mechanisms based on a set of app-specific rules and the search query 102 and/or the query parameters 104. In these implementations, the app-specific rules define templates for generating the state identifier and/or access mechanisms. The search module 212 can input one or more parameter values into the template based on the search query 102 and/or context parameters 104, thereby generating the state identifier and/or access mechanisms. The search module 212 can determine a relevance score for each of the search results 130, as discussed above. The generated search results 130 may include one or more access mechanisms that link to a state of a software application, display data that is displayed in the search result at the user device 300, a relevance score, and an action ID indicating an action corresponding to the linked to state. At operation 430, the ranking module 214 groups the search results 130 into sets of functionally similar search results 130 based on the action ID in the search results 130.

At 440, the ranking module 214 ranks each set of functionally similar search results 130. Operations 442-446 define an example technique for ranking functionally similar search results 130 and can be performed for each set of functionally similar search results 130. At operation 442, the ranking module 214 obtains the ranking vector 110. In some implementations, the ranking module 214 retrieves the global ranking vector 110-g from the ranking data store 222 based on the action ID defined in the set of functionally similar search results 130. In other implementations, the ranking module 214 queries the vector data store 222 with a region ID or geolocation corresponding to the user device 300 and the action ID of the functionally similar search results 130. If the regional ranking vector 110-r corresponding to the region and action ID is stored in the vector data store 222, the ranking module 214 retrieves the regional ranking vector 110-r. Otherwise, the ranking module 214 retrieves the global ranking vector 110-g corresponding to the action ID.

At 444, the ranking module 214 generates an empty ranked set of functionally search results 140. The empty set will be populated with the search results in the (unranked) set 131 of functionally similar search results 130. At 446, the ranking module 214 ranks the functionally similar search results 130. The ranking module 214 can rank a set of functionally similar search results 130 using a random number generator and the retrieved ranking vector 110 (regional ranking vector 110-r or global ranking vector 110-g). The ranking module 214 iteratively appends individual search results from the (unranked) set 131 of functionally similar search results 130 to the ranked set of search results 140. In doing so, the ranking module 214 iteratively generates a random number between the lower limit and upper limit of the global ranking vector 110-g. At each iteration, the ranking module 214 generates a random number and determines the range defined in the ranking vector 110 that the random number fall into. In other words, the ranking module 214 determines to which application in the ranking vector 110 does the random number correspond. The ranking module 214 then determines if the (unranked) set 131 of functionally similar search results 130 includes any search results corresponding to the identified application. If so, the ranking module 214 removes the search result linking to the identified application with the highest relevance score from the (unranked) set of functionally similar search results 130 and appends the removed search result to the ranked set 140 of functionally similar search results 130. If there are no search results 130 that correspond to the identified application, the ranking module 214 generates a new random number. Each time the ranking module 214 adds a new search result to the ranked set of functionally similar search results 130, the ranking module 214 can generate a new random number until the (unranked) set 131 of functionally similar search results 130 is exhausted. Furthermore, in some implementations the ranking module 214 may remove the range corresponding to the identified application from the ranking vector when there are no more search results 130 linking to the identified application remaining in the (unranked) set 131 of functionally similar search results 130. In these implementations, the ranking module 214 compresses the other ranges of the other applications in the ranking vector, such that the remaining ranges are contiguous. In compressing the ranges in the ranking vector, the minimum value and/or the maximum value of the ranking vector are updated. Thus, the minimum and maximum constraints on the random number generator are updated in accordance with the minimum and maximum value of the ranking vector after compression of the ranges. In these implementations, the efficiency of the ranking module 214 may be improved as the number of iterations performed by the ranking module 214 when ranking a set of functionally similar search results 130 may be reduced.

At 450, the ranking module 214 transmits the ranked search results 130 to the user device 300. In some implementations, the ranking module 214 can interleave the different ranked sets of functionally similar search results 130. The ranking module 214 can encode the interleaved search results 130 into a container (e.g., a JSON file or XML file). In other implementations, the ranking module 214 encodes the different ranked sets of functionally similar search results 130 separate from one another. The ranking module 214 (or another downstream component) may transmit the container containing the search results 130 to the user device 300.

The method of FIG. 4 is provided for example. Variations of the method are contemplated. For instance, the ranking module 214 may utilize the regional ranking vector 110-r in lieu of the global ranking vector 110-g when the regional ranking vector 110-r is available. Additionally or alternatively, the ranking module 214 may retrieve the ranking vectors (global and/or regional) corresponding to the (unranked) sets 131 of functionally similar search results 130 and may transmit the unranked search results 131 with the retrieved ranking vectors.

Figure 5:
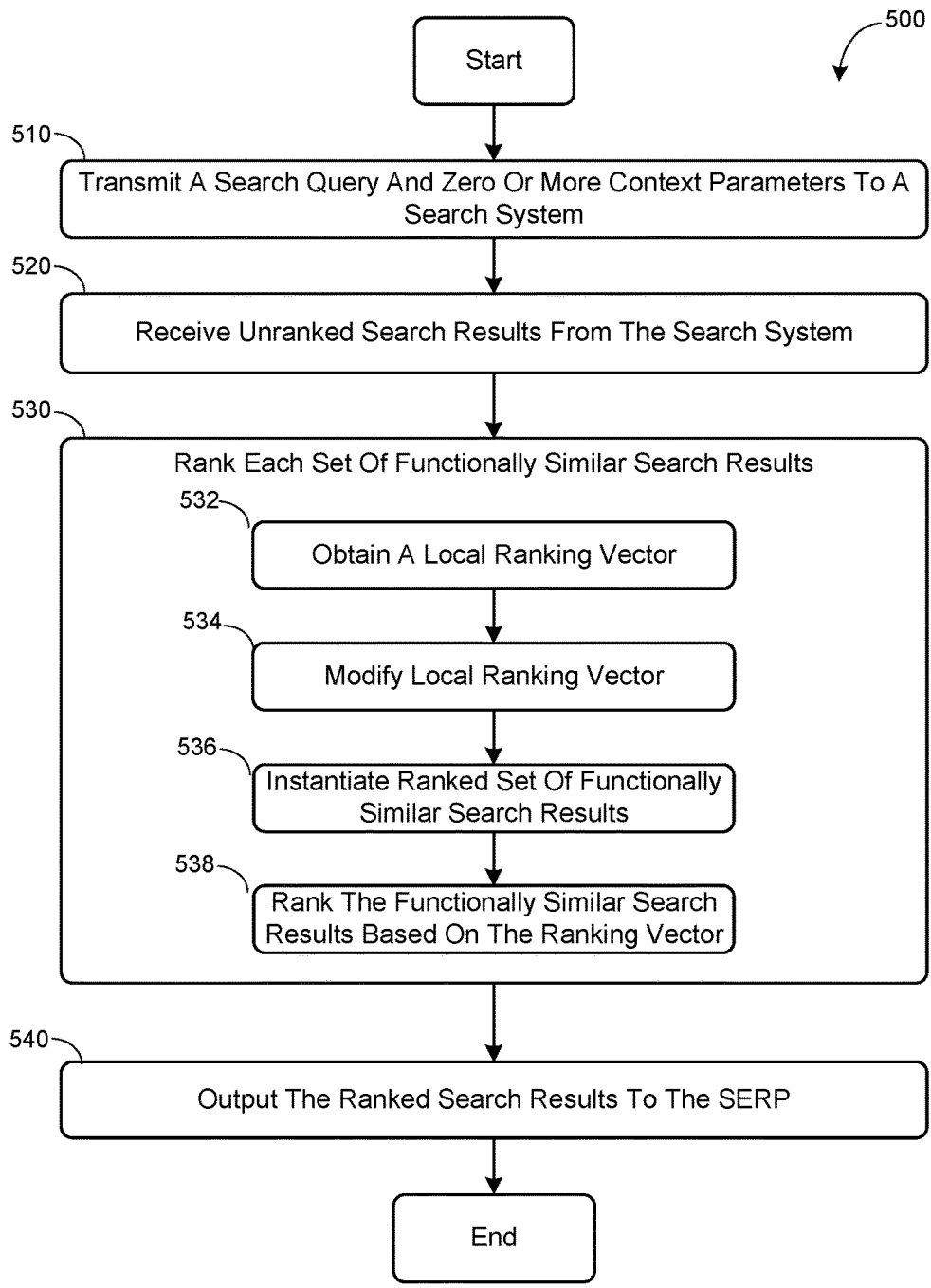
FIG. 5 is a flow chart illustrating an example set of operations of a method for ranking search results at a user device.

FIG. 5 illustrates an example set of operations of a method 500 for ranking search results 130 at the user device 300. The method 500 is described with respect to the search application 318 that is executed at the user device 300.

At 510, the search application 318 transmits the search query 102 and, in some implementations, one or more context parameters to the search system 200. The context parameters include a location of the user device 300. At 520, the search application receives unranked search results 131 from the search system 200. The search results 130 may be separated into (unranked) sets 131 of functionally similar search results 130. In the case the search results 130 are not separated into sets of functionally similar search results 130, the search application 318 can group the search results 130 based on their respective action IDs.

At 530, the search application 318 ranks the sets of functionally similar search results 130 based on the local ranking vector 110-l. Operations 532-538 define an example technique for ranking functionally similar search results 130 and may be performed for each set of functionally similar search results 130. At 532, the search application 318 obtains the local ranking vector 110-l corresponding to the (unranked) set 131 of functionally similar search results 130. The search application 318 may retrieve the local ranking vector 110-l using the action ID defined in the functionally similar search results 130. In some implementations, the search results 130 may be accompanied with one or more ranking vectors 110. The ranking vectors may be regional ranking vectors 110-r and/or global ranking vectors 110-g. In these implementations, the search application 318 may modify the local ranking vector 110-l using the ranking vector 110 received from the search system 200 corresponding to the same action, as shown at 534. For instance, the search application 318 may multiply the range of each application in the local ranking vector 110-l with the corresponding range of the application in the received ranking vector 110. In this way, the modified range (e.g., the product of the two ranges) defined in the local ranking vector 110-*l* is also indicative of the preferences of other users as well. This may help the user discover new applications that they were not necessarily aware of.

At 536, the search application 318 instantiates the ranked set 140 of functionally similar search results 130. Initially, the ranked set 140 of search results 130 is an empty set. At 538, the search application 318 iteratively ranks the search results 130 based on the local ranking vector 110-*l* and a random generator. At each iteration, the search application 318 generates a random number between the lower limit and upper limit of the local ranking vector 110-*l*. The search application 318 then determines the range of the local ranking vector 110-*l* that the random number fall into. In other words, the search application 318 determines to which application in the local ranking vector 110-*l* does the random number correspond. The search application 318 then determines if the (unranked) set 131 of functionally similar search results 130 includes any search results corresponding to the identified application. If so, the search application 318 removes the search result with the highest relevance score that links to the identified application from the (unranked) set 131 of functionally similar search results 130 and appends the removed search result to the ranked set 140 of functionally similar search results 130. If there are no search results 130 that correspond to the identified application, the search application 318 generates a new random number. Each time the search application 318 adds a new search result to the ranked set of functionally similar search results 130, the search application 318 can generate a new random number until the (unranked) set 131 of functionally similar search results 130 is exhausted. Furthermore, in some implementations the search application 318 may also remove the range corresponding to the identified application from the local ranking vector 110-*l* when there are no more search results 130 linking to the identified application remaining in the unranked set 131 of functionally similar search results 130. In these implementations, the search application 318 compresses the other ranges of the other applications in the local ranking vector, such that the compressed ranges are contiguous. In compressing the ranges in the ranking vector, the minimum value and/or the maximum value of the ranking vector are updated. Thus, the minimum and maximum constraints on the random number generator are updated in accordance with the minimum and maximum value of the ranking vector after compression of the ranges. In these implementations, the efficiency of the search application 318 may be improved as the number of iterations of the search application 318 performs while ranking a set of functionally similar search results 130 may be reduced.

At 540, the search application 318 outputs the search results 130 to the SERP. The search application 318 may interleave the different ranked sets of functionally search results and may output the interleaved search results 130 to the SERP. Alternatively, the search application 318 can output the separate ranked sets of functionally search results 130 to the SERP. In these implementations, the ranked sets of functionally search results may be displayed in different columns or different pages of the SERP.

The method 500 of FIG. 5 is provided for example. Variations of the method are contemplated and within the scope of the disclosure. For example, in some implementations, the regional ranking vector 110-*r* may be used in lieu of a local ranking vector when the user is away from his or her home region.

A state of a software application can refer to a parameterized function of the software application. A software application can perform one or more functions. A function is a service of the software application that can be accessed by a user device via an edition of the software application. Non-limiting examples of functions can include "making a restaurant reservation" (which may parameterized with a restaurant identifier, a date, and a time), "searching for a cuisine (which may be parameterized with a cuisine type and a location) "view flight prices" (which may be parameterized with departure and arrival airport codes, arrival and departure dates, and round trip flags), "request a driver" (which may be parameterized with a pick-up location), and "view a file" (which may be parameterized with a file identifier). A state of a software application can be accessed from a user device using an edition of the software application. An operating system of a user device can instruct an edition of a software application to access a state of the software application using an access mechanism.

A software application can refer to a software product that causes a computing device to perform a function. In some examples, a software application may also be referred to as an "application," "an app," or a "program." Example software applications include, but are not limited to, productivity applications, social media applications, messaging applications, media streaming applications, social networking applications, and games. Software applications can perform a variety of different functions for a user. For example, a restaurant reservation application can make reservations for restaurants. As another example, an internet media player application can stream media (e.g., a song or movie) from the Internet. In some examples, a single software application can provide more than one function. For example, a restaurant reservation application may also allow a user to retrieve information about a restaurant and read user reviews for the restaurant in addition to making reservations. As another example, an internet media player application may also allow a user to perform searches for digital media, purchase digital media, generate media playlists, and share media playlists. The functions of an application can be accessed using native application editions of the software application and/or web application editions of the software application.

A native application edition (or "native application") is, at least in part, installed on a user device. In some scenarios, a native application is installed on a user device, but accesses an external resource (e.g., an application server) to obtain data from the external resource. For example, social media applications, weather applications, news applications, and search applications may respectively be accessed by one or more native application editions that execute on various user devices. In such examples, a native application can provide data to and/or receive data from the external resource while accessing one or more functions of the software application. In other scenarios, a native application is installed on the user device and does not access any external resources. For example, some gaming applications, calendar applications, media player applications, and document viewing applications may not require a connection to a network to perform a particular function. In these examples, the functionality of the software product is encoded in the native application editions itself. The native application edition is able to access the functions of the software application without communicating with any other external devices.

Web application editions (also referred to as "web applications") of a software application may be partially executed by a user device (e.g., by a web browser executed by the user device) and partially executed by a remote computing device (e.g., a web server or application server). For example, a web application may be an application that is executed, at least in part, by a web server and accessed by a web browser (e.g., a native application) of the user device. Example web applications may include, but are not limited to, web-based email, online auctions websites, social-networking websites, travel booking websites, and online retail websites. A web application accesses functions of a software product via a network. Example implementations of web applications include webpages and/or HTML-5 application editions.

In some scenarios, a software application may be accessed by one or more native application editions of the software application and/or one or more web application editions of the software application. In these scenarios, there may be overlap between the states or functions that the native application edition(s) can access and the states or functions that the web application edition can access. For example, a restaurant review application may have reviews of thousands of restaurants and may also provide an on-line ordering function from some of the restaurants. The restaurant review application may be accessed by a first native application edition configured for a first operating system (e.g., the ANDROID operating system maintained by Google, Inc.), a second native application edition configured for a second operating system (e.g., the IOS operating system developed by Apple, Inc.), and a web application edition (e.g., a website) of the restaurant review application. The restaurant review application may allow all the editions (native and web) to access the various reviews of restaurants but may only allow on-line orders to be placed using the native application editions. In this way, some states or functions of the restaurant review application cannot be accessed by the web application edition but there is overlap between the states or functions that can be accessed by the native application editions and the web application edition.

A user device can access a state of a software application via an edition of the software application using an access mechanism. When rendering a set of search results, a user device displays a set of user selectable links that can be selected by a user of the user device. A user selectable link may include one or more underlying access mechanisms. A user selectable link, when selected by a user, causes the user device to access a state of the software application using an edition of the software application identified by the access mechanism. Examples of access mechanisms can include, but are not limited to, application access mechanisms, web access mechanisms, application download addresses, and scripts. The different types of access mechanisms are discussed in greater detail below.

An application access mechanism may be a string that includes a reference to a native application and indicates one or more operations for the user device to perform. If a user selects a user selectable link including an application access mechanism, the user device may launch the native application referenced in the application access mechanism and perform the one or more operations indicated in the application access mechanism. In some implementations, any combination of the operating system of the user device, a search application executed by the user device, a native application executed by the user device, and/or a web browser executed by the user device can launch the native application referenced in the application access mechanism.

A web access mechanism may be a string that includes a reference to a web application edition of a software product, and indicates one or more operations for a web browser to execute. A web access mechanism may be a resource identifier that includes a reference to a web resource (e.g., a page of a web application/website). For example, a web access mechanism may refer to a uniform resource locator (URL) used with hypertext transfer protocol (HTTP). If a user selects a user selectable link including a web access mechanism, the user device may launch a web browser application and may pass the resource identifier to the web browser. The web browser can utilize the resource identifier to retrieve the web resource indicated in the resource identifier and/or access a function of the software application indicated by the resource identifier.

An application download access mechanism may indicate a location (e.g., a digital distribution platform) where a native application can be downloaded in the scenario where a native application edition of the application is not installed on the user device. If a user selects a user selectable link including an application download access mechanism, the user device may access a digital distribution platform from which the referenced native application edition may be downloaded. The user may opt to download the native application edition. Upon doing so, the user device may launch the native application edition and may access the state of the software application using the native application edition and an application access mechanism associated with the user selectable link.

A script is a set of instructions, that when executed by the user device cause the user device to access a resource indicated by the script. For example, the script may instruct an operating system of the user device to launch the native application, and may define one or more additional instructions to access a particular state of the application. Another type of access mechanisms may include scripts, which may be used instead of other type of access mechanism when an edition of a software application is not configured to be referenced by the other types of access mechanisms.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus," "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

APPENDIX A

Example Ranking Algorithm At Search System

1. Identify one or more unranked sets of functionally similar search results
2. For (x=0; x == number of unranked sets of functionally similar search results; x++){
3. Retrieve ranking vector based on the action;
4. Instantiate ranked set of functionally similar search results;
5. do while(number of search results in unranked sets > 0){
6.     Generate random number between minimum and maximum value of the ranking vector;
7.     identify application in ranking vector having the range in which the random number falls;
8.     if(num_search_results (identified application, unranked set)>0){
9.         remove search result having highest relevance score that links to the identified application from the unranked set of search results;
10.        append removed search result to ranked set of search results; }
11.     else{
12.        Remove range corresponding to identified application;
13.        Compress vector by shifting remaining ranges to be contiguous;
14.        Redefine minimum and maximum value of the ranking vector based on the remaining compressed vector;
16.     }
17. }
18. }

APPENDIX B

Example Ranking Algorithm At User Device

1. Receive initial set of search results corresponding to an action
2. For (x=0; x == number of unranked sets of functionally similar search results; x++){
3. Retrieve local ranking vector corresponding to the action;
4. Instantiate ranked set of functionally similar search results;
5. do while(number of search results in unranked sets > 0){
6.     Generate random number between minimum and maximum value of the ranking vector;
7.     identify application in ranking vector having the range in which the random number falls;
8.     if(num_search_results (identified application, unranked set)>0){
9.         remove search result having highest relevance score that links to the identified application from the unranked set of search results;
10.        append removed search result to ranked set of search APPENDIX B-continued Example Ranking Algorithm At User Device results; }
11.     else{
12.        Remove range corresponding to identified application;
13.        Compress vector by shifting remaining ranges to be contiguous;
14.        Redefine minimum and maximum value of the ranking vector based on the remaining compressed vector;
16.     }
17. }
18. }

What is claimed is:

1. A method comprising:
receiving, by a search system, a search query from a remote device;
identifying, by the search system, an unranked set of functionally similar search results based on the search query, the unranked set of functionally similar search results collectively linking to states of two or more software applications, each search result linking to a specific state of a respective software application, and the unranked set of functionally similar search results corresponding to an action;
retrieving, by the search system, a ranking vector corresponding to the action, the ranking vector identifying a plurality of software applications that perform a function corresponding to the action and a ranking range for each of the plurality of software applications, each ranking range having a respective upper value and a respective lower value, the ranking ranges of the ranking vector being non-overlapping and collectively defining a total range having a minimum value of the ranking vector and a maximum value of the ranking vector;
generating, by the search system, a random number between the minimum value and the maximum value of the ranking vector;
iteratively ranking, by the search system, the functionally similar search results of the unranked set, the ranking being based on the retrieved ranking vector and the random number;
obtaining, by the search system, a ranked set of the functionally similar search results; and
transmitting, by the search system, the ranked set of the functionally similar search results to the remote device.

2. The method of claim 1, wherein the retrieving of the ranking vector includes querying a ranking vector data store with an action identifier of the action, the ranking vector data store outputting a global ranking vector corresponding to the action, the global ranking vector being indicative of collective preferences of a group of users when leveraging functions of applications corresponding to the action.

3. The method of claim 2, wherein the querying of the ranking vector data store includes:
querying the ranking vector data store with the action identifier of the action and a region identifier indicating a region associated with the remote device, the ranking vector data store outputting:
a regional ranking vector when regional ranking vector corresponding to the region identifier and the action exists in the ranking vector data store, the regional ranking vector being indicative of collective preferences of a group of users when leveraging functions of applications corresponding to the action from the region indicated by the region identifier, and the global ranking vector corresponding to the action when the ranking vector data store does not include a regional ranking vector corresponding to both the region identifier and the action identifier.

4. The method of claim 2, further comprising:
receiving, by the search system, engagement statistics corresponding to the ranked set of functionally similar search results, the engagement statistics indicating a user selection of one of the functionally similar search results; and
updating, by the search system, the ranges in the global ranking vector based on the engagement statistics.

5. The method of claim 1, wherein the iterative ranking of the functionally similar search results of the unranked set includes:
determining an application of the plurality of software applications based on the random number and the ranking vector;
removing a search result from the unranked set that links to the determined application; and
appending the removed search result to the ranked set of search results.

6. The method of claim 5, wherein the removing of the search result from the unranked set includes:
when more than one search result link to the determined application, removing the search result from the unranked set with the highest relevance score.

7. The method of claim 1,
wherein the iterative ranking of the functionally similar search results of the unranked set includes:
instantiating the ranked set of search results, the ranked set of search results initially being an empty set,
determining an application of the plurality of software applications based on the random number and the ranking vector,
removing a search result from the unranked set that links to the determined application, and
appending the removed search result to the ranked set of search results, and
wherein the determining of the application, the removing of the search result, and the appending of the removed search result are iteratively performed until the unranked set is empty.

8. The method of claim 7, wherein the removing of the search result from the unranked set includes:
when more than one search result link to the determined application, removing the search result from the unranked set with the highest relevance score.

9. The method of claim 1, wherein the identifying of the unranked set of functionally similar search results includes:
identifying a plurality of search results based on the search query, the plurality of search results including the functionally similar search results, and each search result linking to a state of a respective software application and including an action identifier corresponding to a function performed at the linked to state; and
grouping the plurality of search results based on the action identifiers defined therein to obtain a plurality of unranked sets of functionally similar search results, including the unranked set of functionally similar search results, each unranked set corresponding to a different action.

10. The method of claim 9, further comprising:
for each other unranked set of functionally similar search results of the plurality of unranked sets:
retrieving, by the search system, another ranking vector corresponding to the action of the other unranked set,
iteratively ranking, by the search system, the functionally similar search results of the other unranked set to obtain another ranked set of functionally similar search results, the ranking being based on the retrieved other ranking vector and the random number generator, and
transmitting, by the search system, the other ranked set to the remote device.

11. A portable device comprising:
a transceiver configured to receive a search query from a remote device;
a storage configured to store a ranking vector identifying a plurality of software applications that perform a function corresponding to an action and a ranking range for each of the plurality of software applications, each ranking range having a respective upper value and a respective lower value, the ranking ranges of the ranking vector being non-overlapping and collectively defining a total range having a minimum value of the ranking vector and a maximum value of the ranking vector; and
a processor configured to:
identify an unranked set of functionally similar search results based on the search query, the unranked set of functionally similar search results collectively linking to states of two or more software applications, each search result linking to a specific state of a respective software application, and the unranked set of functionally similar search results corresponding to an action,
retrieve, from the storage, a ranking vector corresponding to the action,
generate a random number between the minimum value and the maximum value of the ranking vector,
iteratively rank the functionally similar search results of the unranked set, the ranking being based on the retrieved ranking vector and the random number,
obtain a ranked set of the functionally similar search results, and
transmit, via the transceiver, the ranked set of the functionally similar search results to the remote device.

* * * * *